United States Patent [19]
Katoh et al.

[11] Patent Number: 5,726,813
[45] Date of Patent: Mar. 10, 1998

[54] OPTICAL APPARATUS WITH REPLACEMENT SEMICONDUCTOR LASER

[75] Inventors: Hiroaki Katoh; Toshitaka Aoki; Kota Goto, all of Kawasaki, Japan

[73] Assignee: Fujitsu Limited, Kawasaki, Japan

[21] Appl. No.: 392,168

[22] Filed: Feb. 22, 1995

[30] Foreign Application Priority Data

Mar. 14, 1994 [JP] Japan ................... 6-042248

[51] Int. Cl.⁶ ........................... G02B 3/00; H01S 3/00
[52] U.S. Cl. ........................... 359/809; 372/38
[58] Field of Search ................ 359/809; 347/247, 347/263, 242, 245; 372/38

[56] References Cited

U.S. PATENT DOCUMENTS

| | | | |
|---|---|---|---|
| 4,351,005 | 9/1982 | Iami et al. | 358/300 |
| 4,763,334 | 8/1988 | Shimada et al. | 372/29 |
| 5,048,050 | 9/1991 | Komurasaki | 372/101 |
| 5,113,291 | 5/1992 | Naiki | 359/823 |
| 5,381,438 | 1/1995 | Guo et al. | 372/107 |
| 5,495,281 | 2/1996 | Nashida et al. | 347/263 |

FOREIGN PATENT DOCUMENTS

| | | |
|---|---|---|
| 7-218851 | 8/1995 | Japan . |
| 2266005 | 10/1993 | United Kingdom . |
| WO 91/03085 | 3/1991 | WIPO . |
| WO 93/05553 | 3/1993 | WIPO . |

*Primary Examiner*—David C. Nelms
*Assistant Examiner*—Ricky Mack
*Attorney, Agent, or Firm*—Staas & Halsey

[57] ABSTRACT

An optical apparatus including a laser light source unit and an apparatus main body is disclosed. The laser light source unit has a barrel for holding a lens and a unit side connector for connecting a semiconductor laser to an external circuit. The apparatus main body has an insertion hole and a main body side connector. The unit side connector is intended to be connected to the main body side connector when the barrel is inserted in the insertion hole.

11 Claims, 6 Drawing Sheets

5,726,813

OPTICAL APPARATUS WITH REPLACEMENT SEMICONDUCTOR LASER

BACKGROUND OF THE INVENTION

1. Field of the Invention

The present invention relates to an optical apparatus such as a laser scanner having a semiconductor laser as a light source.

2. Description of the Related Art

Laser scanners have been used to read out bar-codes, for example, in POS systems in super-markets. As a light source of the optical apparatus of this type, a semiconductor laser (laser diode) has been generally used for reducing the size of the apparatus and realizing the power saving of a light source. However, because of the short service life of a semiconductor laser relative to the operating time of the optical apparatus of this type, there has been demands toward the easy replacement of the light source.

Although a laser scanner has been known as a commercial apparatus having a semiconductor laser as a light source, there has not yet been proposed a structure intended to simplify the replacement of a semiconductor laser.

SUMMARY OF THE INVENTION

An object of the present invention is to provide an optical apparatus capable of easily replacing a semiconductor laser.

According to the present invention, there is provided an optical apparatus having a semiconductor laser as a light source, including: a laser light source unit having the semiconductor laser for converting a light emitted from the semiconductor laser into a specified light beam and outputting the specified light beam; and an apparatus main body on which the laser light source unit is removably mounted. The above laser light source unit further has a barrel for guiding the light beam, and a unit side connector for connecting the semiconductor laser to an external circuit. The above apparatus main body has an insertion hole into which the barrel is closely inserted, and a main body side connector to which the unit side connector is connected. With this arrangement, the unit side connector is intended to be connected to the main body side connector when the barrel is inserted in the insertion hole.

An optical apparatus of the present invention is so constructed that a laser light source unit is removably mounted onto an apparatus main body for easily replacing a semiconductor laser. In the replacement of a semiconductor laser, the barrel of the laser light source unit is closely inserted in an insertion hole of the apparatus main body, and simultaneously a unit side connector is connected to a main body connector. The rotational position of the barrel is thus determinable, which eliminates the need for the adjustment of an optical axis.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Hereinafter, embodiments of the present invention will be described in detail with reference to the drawings.

Figure 1:
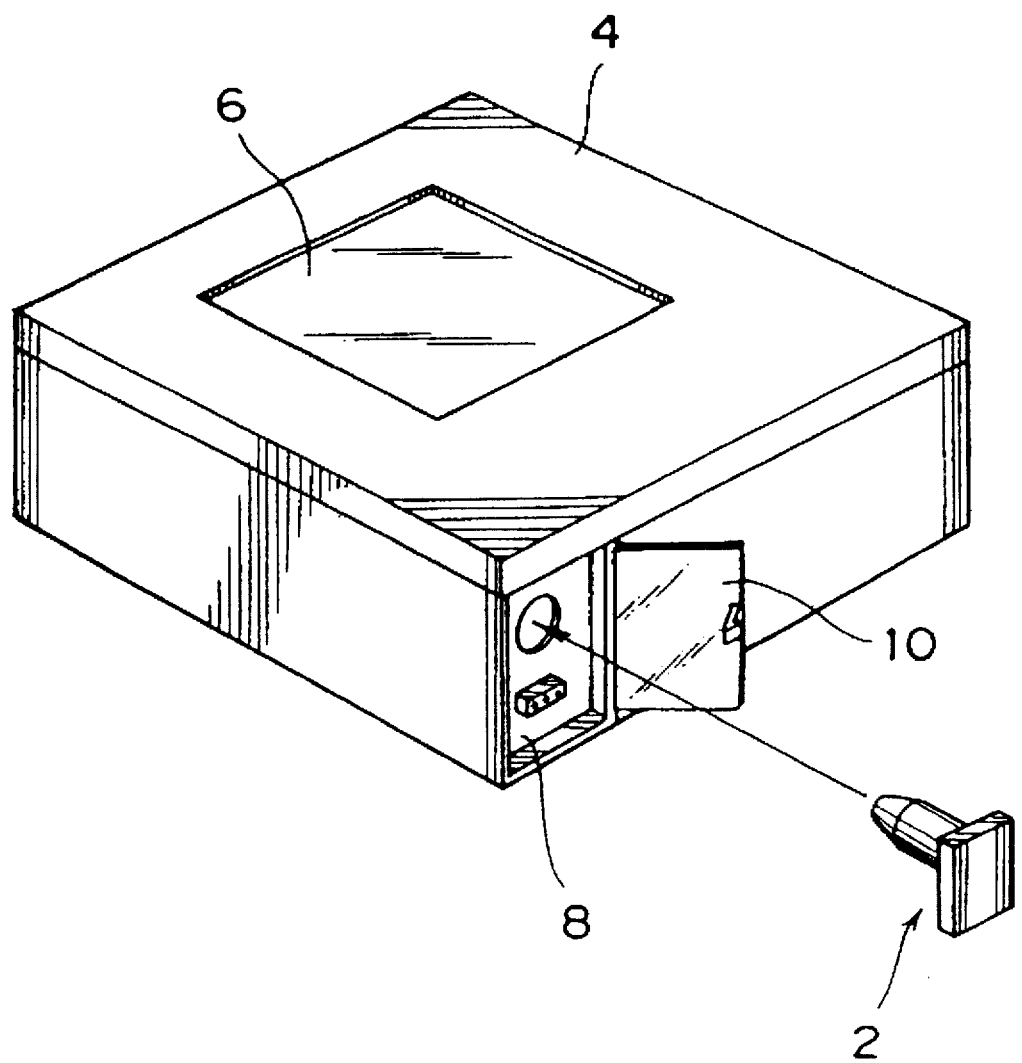
FIG. 1 is a perspective view of a bar code scanner according to an embodiment of the present invention.

FIG. 1 is a perspective view of a bar code scanner embodying the present invention. The scanner has a laser light source unit 2 containing a semiconductor laser, and an apparatus main body 4 on which the laser light source unit 2 is to be removably mounted. A scanning unit (not shown) scans a laser light through a platen glass 6 provided on the upper portion of the apparatus main body 4 for reading out a bar code label attached on an article of commerce or the like (not shown). The laser light source unit 2 is mounted on a unit mounting portion 8 of the apparatus main body 4, and which is usable in the state that an openable cover 10 provided on the apparatus main body 4 is closed.

Figure 2:
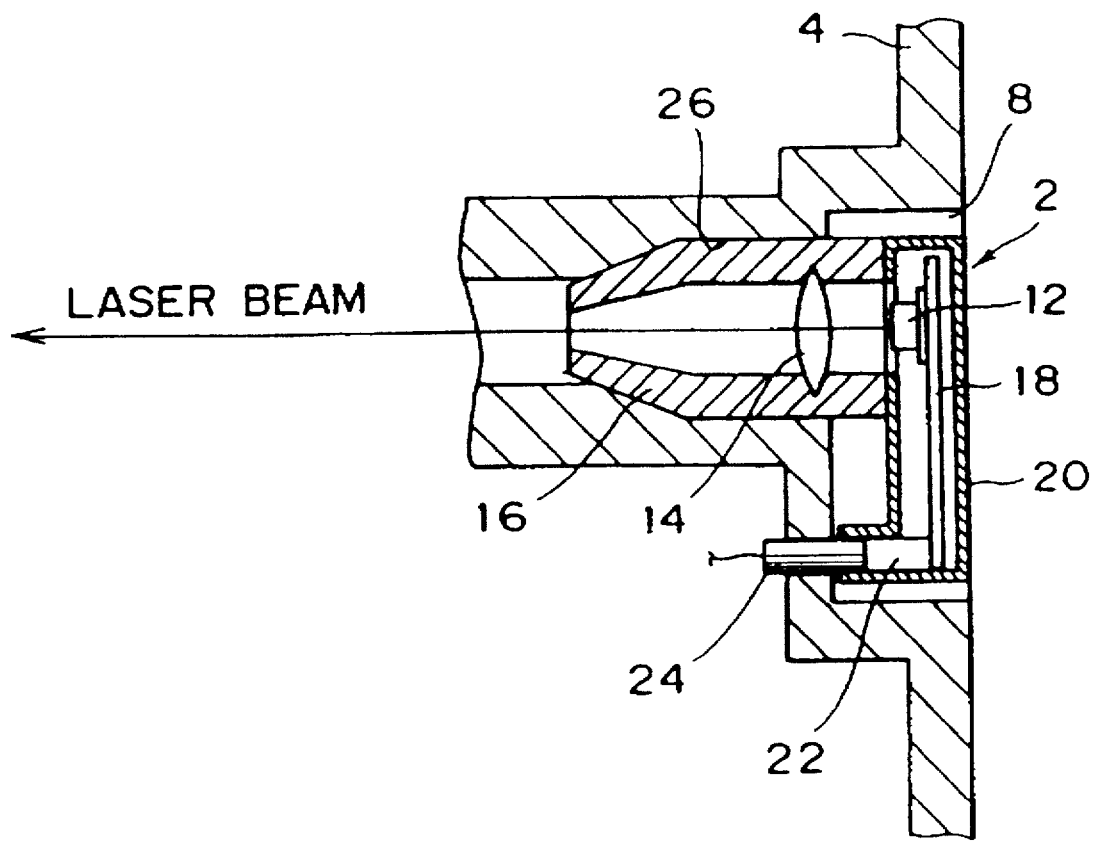
FIG. 2 is a sectional view of a unit mounting portion of the laser light source unit shown in FIG. 1.

FIG. 2 is a sectional view of the unit mounting portion shown in FIG. 1. The laser light source unit 2 has a semiconductor laser 12, and a lens 14 for converting a light emitted from the semiconductor laser 12 into a specified light beam. The lens 14 is held in a lens barrel 16 formed substantially in a cylindrical shape (for example, taper-off shape in cross-section). The semiconductor laser 12 is contained in a unit case 20 while being mounted on a circuit board 18. The unit case 20 is joined to the lens barrel 16 in such a manner as to hold a predetermined positional relationship between the semiconductor laser 12 and the lens 14, thus forming the laser light source unit 2. A unit side connector 22 for connecting the semiconductor laser 12 to an external circuit is mounted on the circuit board 18. In addition, electronic parts forming a circuit for driving the semiconductor laser 12 are mounted on the circuit board 18. The unit mounting portion 8 of the apparatus main body 4 is provided with an insertion hole 26 into which the lens barrel 16 is closely inserted, and a main body side connector 24 to which the unit side connector 22 is connected.

In the apparatus of this embodiment, the parts are arranged such that the unit side connector 22 is connected to the main body side connector 24 when the lens barrel 16 of the laser light source unit is inserted into the insertion hole 26 of the apparatus main body. The insertion hole 26 has the shape corresponding to that of the lens barrel 16 such that the barrel 16 is closely inserted into the insertion hole 26. By closely inserting the barrel 16 into the insertion hole 26, the positioning of the laser beam output from the laser light source unit 2 relative to the apparatus main body 4 is determinable. Moreover, since the lens barrel 16 is usually located at the same rotational position, the direction of the laser beam is also determinable. Additionally, the semiconductor laser 12 is positioned substantially along the center axis of the lens barrel 16, so that the laser beam can be output in the direction parallel to this center axis. Accordingly, only by positively mounting the laser light source unit 2 on the mounting portion 8 of the apparatus main body 4, the semiconductor laser can be replaced without any additional complicated work such as the adjustment of the optical axis. In this embodiment, the parts are arranged such that the lens barrel 16 is inserted in the insertion hole 26 when the unit side connector 22 is connected to the main body side connector 24, and accordingly, there is no fear that a laser beam is leaked to the exterior in the state that the laser light source unit 2 is not mounted on the apparatus main body 4.

In the replacement of the laser light source unit, for preventing the breakage of an laser element due to electrostatic charge, it is desirable to provide a short-circuiting pin on the laser light source unit. Another embodiment improved in this regard will be described below.

Figure 3:
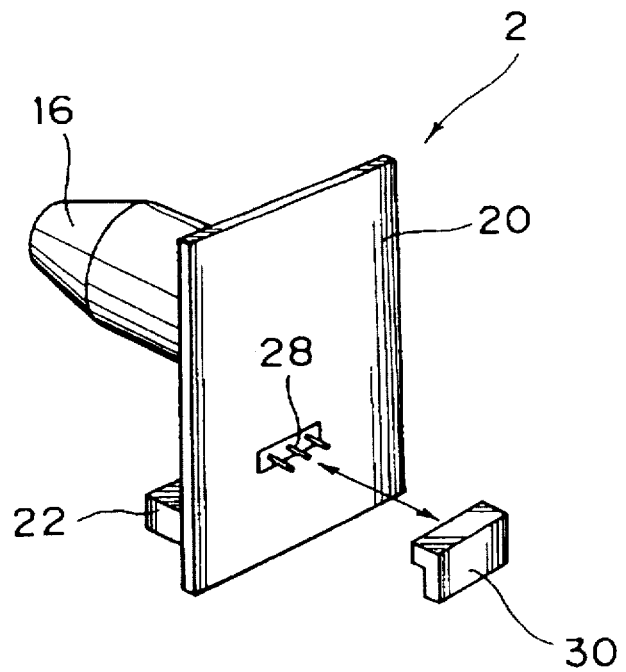
FIG. 3 is a perspective view of a laser light source unit according to another embodiment of the present invention.

FIG. 3 is a perspective view of a laser light source unit having a short-circuiting pin. In this embodiment, a lens barrel 16 and a unit side connector 22 are provided on the same side of the unit case 20, and on the other side of the unit case 20, a short-circuiting pin 28 for short-circuiting a signal line connected to the semiconductor laser is provided. Reference numeral 30 designates a short-circuiting pin cover removably mounted on the short-circuiting pin 28. The signal line of the semiconductor laser is short-circuited when the short-circuiting pin cover 30 is mounted on the short-circuiting pin 28.

Figure 4:
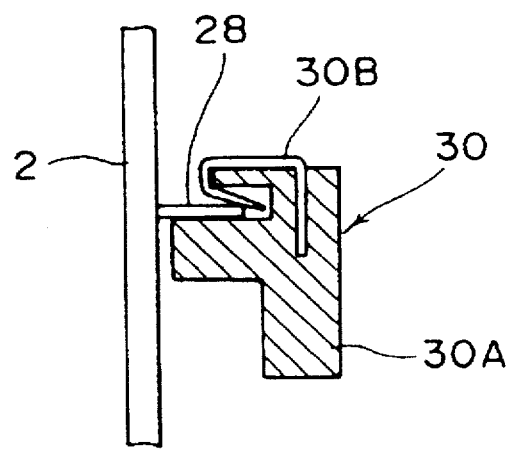
FIG. 4 is a sectional view of a short-circuiting pin cover.

FIG. 4 is a sectional view showing the construction of the short-circuiting pin cover 30. The short-circuiting pin cover 30 has a cover main body 30A having such a shape as to be removably mounted to the short-circuiting pin 28, and a conductive metal fixture 30B having one end being pressfitted in the cover main body 30A and the other end being elastically deformable. When the short-circuiting pin cover 30 is mounted on the short-circuiting pin 28, the conductive metal fixture 30B abuts the short-circuiting pin 28 by its elastic force. This achieves both the short-circuiting of the signal line of the semiconductor laser and the holding of the short-circuit pin cover 30. In this embodiment, during mounting the laser light source unit on the apparatus main body 4 shown in FIG. 1, the short-circuiting pin cover 30 remains mounted to the short-circuiting pin 28, so that it becomes possible to prevent the breakage of the semiconductor laser due to the electrostatic charge.

Figure 5A:
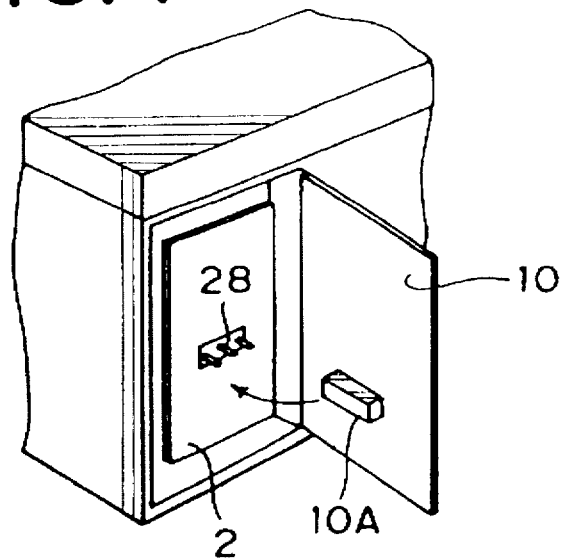
FIGS. 5A, 5B and 5C are views showing a modification of the embodiment shown in FIG. 3.
Figure 5B:
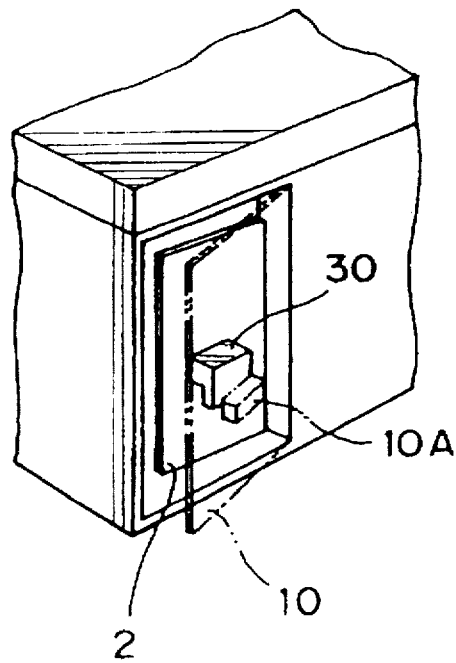
Figure 5C:
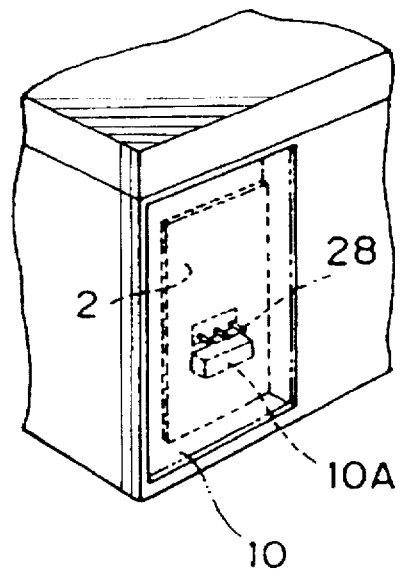

The short-circuiting pin cover 30 is required to be necessarily removed after the laser light source unit is mounted on the apparatus main body 4. FIGS. 5A, 5B and 5C show a structure allowing an operator to easily check for the removable of the short-circuiting pin cover 30. As shown in FIG. 5A, directly under the short-circuiting pin 28 on the inner side of the cover 10, a projection 10A is provided at the position corresponding to that of the leading edge portion of the short-circuiting pin cover 30. In the case where the short-circuiting pin cover 30 remains mounted on the laser light source unit 2, as shown in FIG. 5B, the projection 10A abuts the leading edge portion of the short-circuiting pin cover 30, which does not allow the cover 10 to be closed. On the contrary, in the case where the short-circuiting pin cover 30 is removed from the laser light source unit 2, as shown in FIG. 5C, the cover 10 can be closed. Thus, by checking whether or not the cover 10 can be perfectly closed, it can be judged whether or not the short-circuiting pin cover 30 is certainly removed.

Figure 6A:
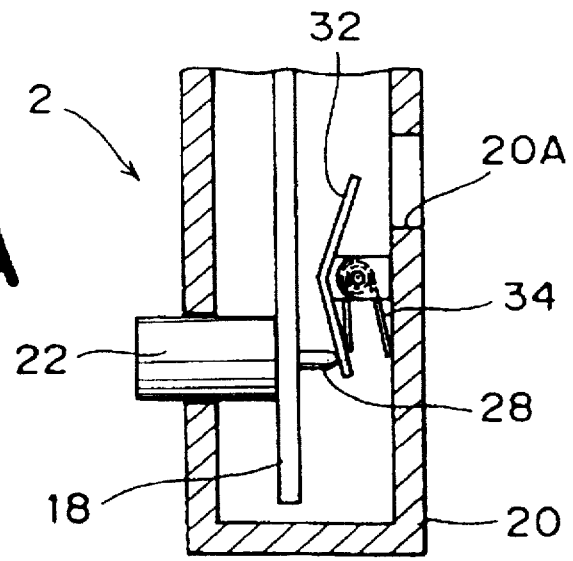
FIGS. 6A and 6B are sectional views of a laser light source unit according to a further embodiment of the present invention.
Figure 6B:
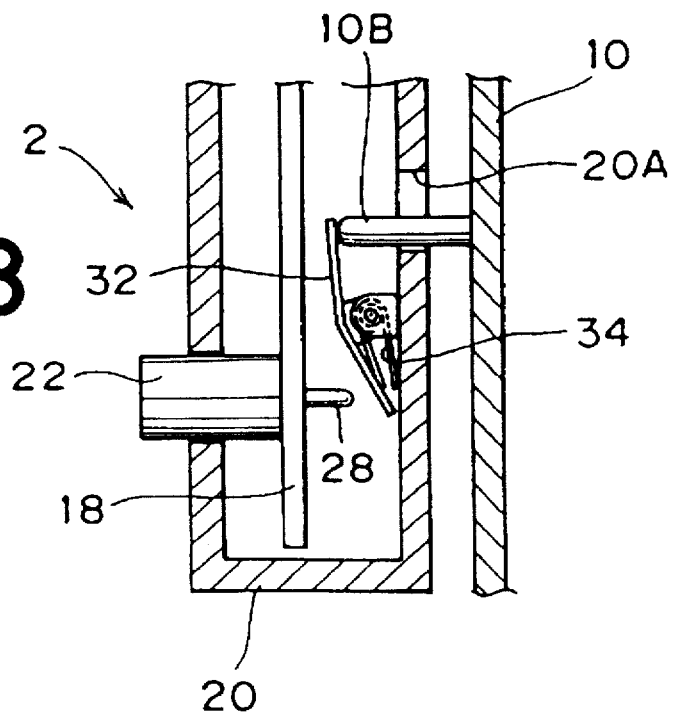
Figure 7:
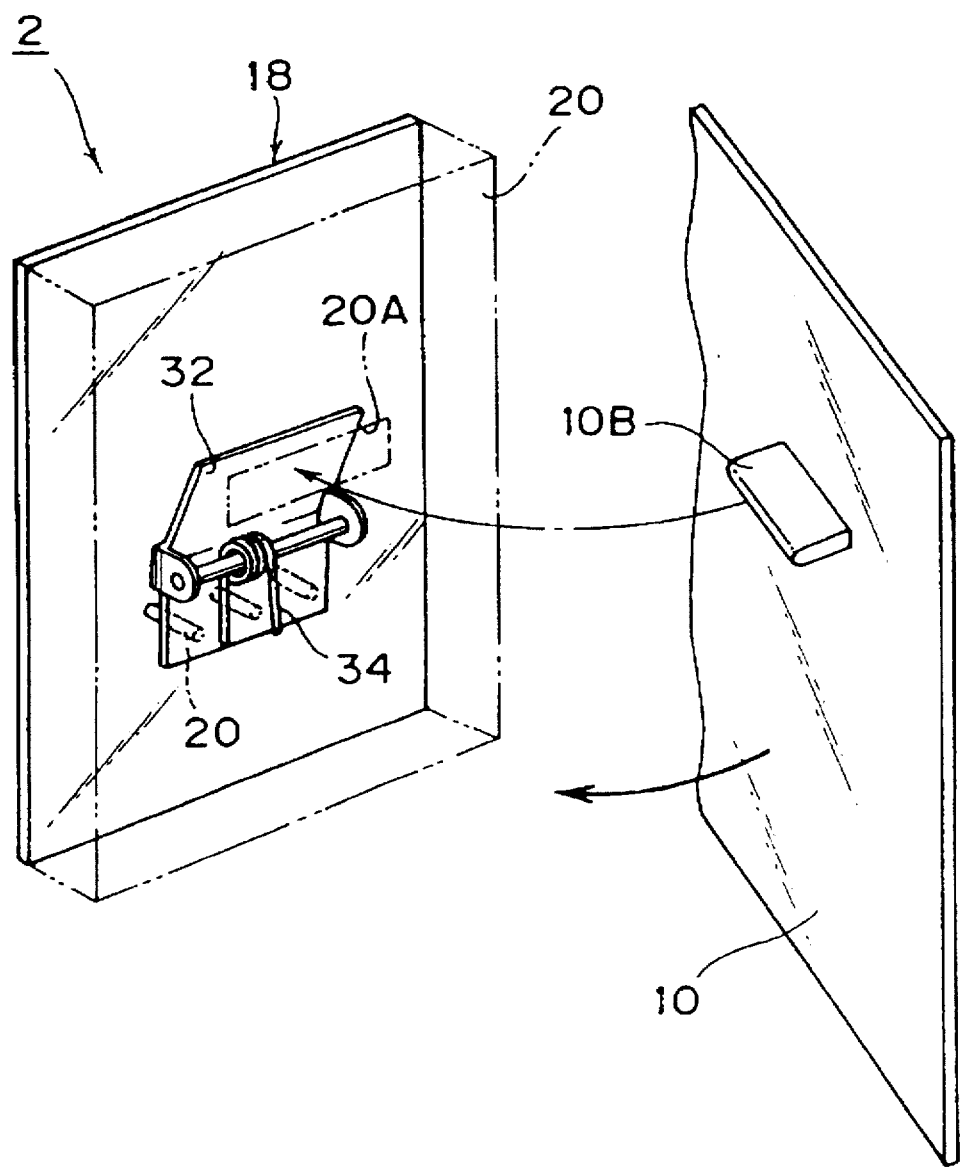
FIG. 7 is a perspective view of the laser light source unit shown in FIG. 6.

FIGS. 6A and 6B are partial sectional views of a laser light source unit according to a further embodiment of the present invention; and FIG. 7 is a perspective view of FIGS. 6A and 6B. In this embodiment, short-circuiting of the short-circuiting pin and the release thereof are automatically performed. In a laser light source unit 2 of this embodiment, as shown in FIG. 6A, a unit case 20 contains a rockable short-circuiting metal fixture 32 for short-circuiting the short-circuiting pin 28, and a spring 34 for biasing the short-circuiting metal fixture 32 such that the first end of the short-circuiting metal fixture 32 is contacted with the short-circuiting pin 28. The second end of the short-circuiting metal fixture 32 is located at the position corresponding to that of an opening 20A formed in the unit case 20. In mounting the laser light source unit 2, the first end of the short-circuiting metal fixture 32 is contacted with the short-circuiting pin 28 by the biasing force of the spring 34, so that the semiconductor laser is made in the short-circuit state, thus preventing the damage of the semiconductor element due to electrostatic charge.

When the cover 10 is closed relative to the apparatus main body after the mounting of the laser light source unit, a projection 10B formed on the inner side of the cover 10 abuts the second end of the short-circuiting metal fixture 32 through the opening 20A of the unit case 20. Thus, as shown in FIG. 6B, the first end of the short-circuiting metal fixture 32 is released from the short-circuiting pin 28, so that the semiconductor laser is made in the operable state. In this embodiment, the removable mounting of the short-circuiting pin cover in the previous embodiment is eliminated, and accordingly, the replacement of the laser light source unit can be further simplified.

The present invention, as described above, has an effect to provide an optical apparatus capable of easily replacing a semiconductor laser.

While specific embodiments of the present invention have been described in the foregoing description, the present invention is not limited to details of the embodiments. The spirit and scope of the present invention is defined in the appended claims, and all alterations and modifications which belong to the scope of equivalency of the claims shall be included in the scope of the present invention.

What is claimed is:

1. An optical apparatus comprising:

a laser light source unit including a semiconductor laser, a barrel for converting a light emitted from said semiconductor laser into a light beam, and a unit side connector for electrically connecting said semiconductor laser to an external circuit; and an apparatus main body on which said laser light source unit is removably mounted, said apparatus main body including an insertion hole into which said barrel is closely inserted, and a main body side connector to which said unit side connector is connected when said barrel is inserted in said insertion hole.

2. An optical apparatus according to claim 1, wherein said barrel and said unit side connector are provided on the same side of said laser light source unit.

3. An optical apparatus according to claim 1, wherein said laser light source unit further includes a short-circuiting pin for short-circuiting a signal line connected to said semiconductor laser.

4. An optical apparatus according to claim 3, wherein said laser light source unit further includes a short-circuiting pin cover removably mounted on said short-circuiting pin for short-circuiting said short-circuiting pin, said apparatus main body further includes an openable cover for covering said laser light source unit mounted on said apparatus main body, and said cover is closed only in the state that said short-circuiting pin cover is removed.

5

5. An optical apparatus according to claim 3, wherein
said laser light source unit further includes a rockable short-circuiting metal fixture for short-circuiting said short-circuiting pin, and a means for biasing said short-circuiting metal fixture such that the first end of said short-circuiting metal fixture is contacted with said short-circuiting pin,
said apparatus main body further includes an openable cover for covering said laser light source mounted on said apparatus main body,
said cover has a projection provided at a position corresponding to that of the second end of said short-circuiting metal fixture, and
said projection abuts the second end of said short-circuiting metal fixture when said cover is closed, thereby releasing the short-circuit state of said short-circuiting pin.

6. A laser light source unit comprising;
a semiconductor laser;
a barrel for converting a light emitted from said semiconductor laser into a light beam; and
an unit side connector for electrically connecting said semiconductor laser to an external circuit, said unit side connector being connected to a main body side connector of a main body when said laser light source unit is removably mounted on said main body.

7. A laser light source unit according to claim 6, further comprising a short-circuiting pin for short-circuiting a signal line connected to said semiconductor laser.

8. An optical apparatus comprising:
a main body which includes a body side connector; and
a laser light source unit which includes a semiconductor laser and a unit side connector for electrically connecting the semiconductor laser to an external circuit, the laser light source unit being mountable on the main body,
wherein, as the laser light source unit is mounted on the main body, the unit side connector of the laser light source unit connects to the body side connector of the main body.

6

9. An optical apparatus according to claim 8, wherein
the semiconductor laser includes a signal line, and
the laser light source unit further includes a short-circuiting pin for short-circuiting the signal line.

10. An optical apparatus according to claim 8, wherein
the semiconductor laser includes a signal line,
the laser light source unit further includes
a short-circuiting pin for short-circuiting the signal line, and
a pin cover removably mounted on the short-circuiting pin, the signal line being short-circuited when the pin cover is mounted on the short-circuiting pin and not being short-circuited when the pin cover is not mounted on the short-circuiting pin, and
the optical apparatus further comprises a cover having a closed position in which the cover covers the laser light source unit when the laser light source unit is mounted on the main body, and an open position where the cover does not cover the laser light source unit, the cover being capable of being in the closed position only when the short-circuiting pin cover is not mounted on the short-circuiting pin.

11. An optical apparatus according to claim 9, wherein
the optical apparatus further comprises a cover having a closed position in which the cover covers the laser light source unit when the laser light source unit is mounted on the main body, and an open position where the cover does not cover the laser light source unit,
the laser light source unit further includes a rockable short-circuiting metal fixture for short-circuiting the short-circuiting pin, the short-circuiting metal fixture contacting the short-circuiting pin to short circuit the signal line of the semiconductor laser when the cover is in the open position, and
the cover including a projection which rocks the short-circuiting metal fixture when the cover is in the closed position so that the short-circuiting metal fixture stops contacting the short-circuiting pin.

* * * * *